United States Patent [19]
Gunji et al.

[11] Patent Number: 5,597,657
[45] Date of Patent: Jan. 28, 1997

[54] SLIDE SURFACE CONSTRUCTION

[75] Inventors: Takahiro Gunji; Yoshikazu Fujisawa; Masamune Tabata; Kazuhisa Okamoto, all of Saitama-ken, Japan

[73] Assignee: Honda Giken Kogyo Kabushiki Kaisha, Tokyo, Japan

[21] Appl. No.: 164,338

[22] Filed: Dec. 10, 1993

[30] Foreign Application Priority Data

Dec. 10, 1992 [JP] Japan ................................. 4-352558

[51] Int. Cl.$^6$ ............................. F16C 33/12; B32B 15/00
[52] U.S. Cl. ........................... 428/680; 428/687; 428/935
[58] Field of Search ................................. 428/615, 687,
428/679, 680, 645, 650, 672, 673, 674;
464/902; 277/235 A, 236; 384/912

[56] References Cited

U.S. PATENT DOCUMENTS

| | | | |
|---|---|---|---|
| 4,406,755 | 9/1983 | Morrissey | 205/265 |
| 4,610,932 | 9/1986 | Haynes et al. | 428/680 |
| 4,767,662 | 8/1988 | Battey et al. | 428/601 |
| 4,934,968 | 6/1990 | Davis et al. | 428/680 |
| 5,310,606 | 5/1994 | Fujisawa et al. | 428/645 |
| 5,342,698 | 8/1994 | Fujisawa et al. | 428/612 |

FOREIGN PATENT DOCUMENTS

| | | | |
|---|---|---|---|
| 4101386 | 7/1991 | Germany | 428/687 |
| 4219144A1 | 12/1992 | Germany . | |
| 2240343 | 7/1991 | United Kingdom | 428/687 |

*Primary Examiner*—John Zimmerman
*Attorney, Agent, or Firm*—Lyon & Lyon

[57] ABSTRACT

A slide surface construction is formed of an aggregate of Ni crystals having a face-centered cubic structure. The aggregate includes {220} oriented Ni crystals with their {220} planes (by Miller indices) oriented toward a slide surface and having a content S in a range represented by S<25%. If the content of the {220} oriented Ni crystals is set in such a range, a large number of quadrangular Ni crystals are precipitated in the slide surface, so that the oil retention and the initial conformability are improved by the Ni crystals. Thus, the slide surface construction exhibits an excellent seizure resistance.

4 Claims, 10 Drawing Sheets

FIG.12 ional combustion engine are desired, the prior art slide surface construction suffer from problems of insufficient oil retaining property, i.e., oil retention and poor initial conformability and seizure resistance.

SUMMARY OF THE INVENTION

It is an object of the present invention to provide a slide surface construction of the type described above, which has sufficient oil retention and good initial conformability by specifying the crystal structure, thereby improving its seizure resistance.

To achieve the above object, according to the present invention, there is provided a slide surface construction, which is formed of an aggregate of metal crystals having a face-centered cubic structure, the aggregate including (hh0) oriented metal crystals with their (hh0) planes (by Miller indices) oriented toward a slide surface, a content S of the (hh0) oriented metal crystals being in a range represented by S<25%.

In the aggregate of the metal crystals having the face-centered cubic structure, if the content S of the (hh0) oriented metal crystals with their (hh0) planes (by Miller indices) oriented toward the slide surface is set in the above described range, a large number of pyramid-shaped (and/or truncated pyramid-shaped) metal crystals are precipitated in the slide surface into a mutually biting state. As a result, the slide surface takes on an intricate morphology comprising a large number of crests, a large number of valleys formed between the crests, and a large number of swamps formed due to the mutual biting of the crests. Therefore, the slide surface construction has good oil retention. In addition, the initial conformability of the slide surface construction is enhanced by the preferential wearing of the tip ends of the pyramid-shaped metal crystals. The seizure resistance of the slide surface construction can be improved by such oil retention and initial conformability. However, if the content S of the (hh0) oriented metal crystals is equal to or more than 25%, the morphology of the slide surface tends to be simplified with an increase in content of the (hh0) oriented metal crystals and hence, the oil retention and the initial conformability of the slide surface construction are reduced.

The above and other objects, features and advantages of the invention will become apparent from the following description of a preferred embodiment, taken in conjunction with the accompanying drawings.

DESCRIPTION OF THE PREFERRED EMBODIMENTS

Figure 1:
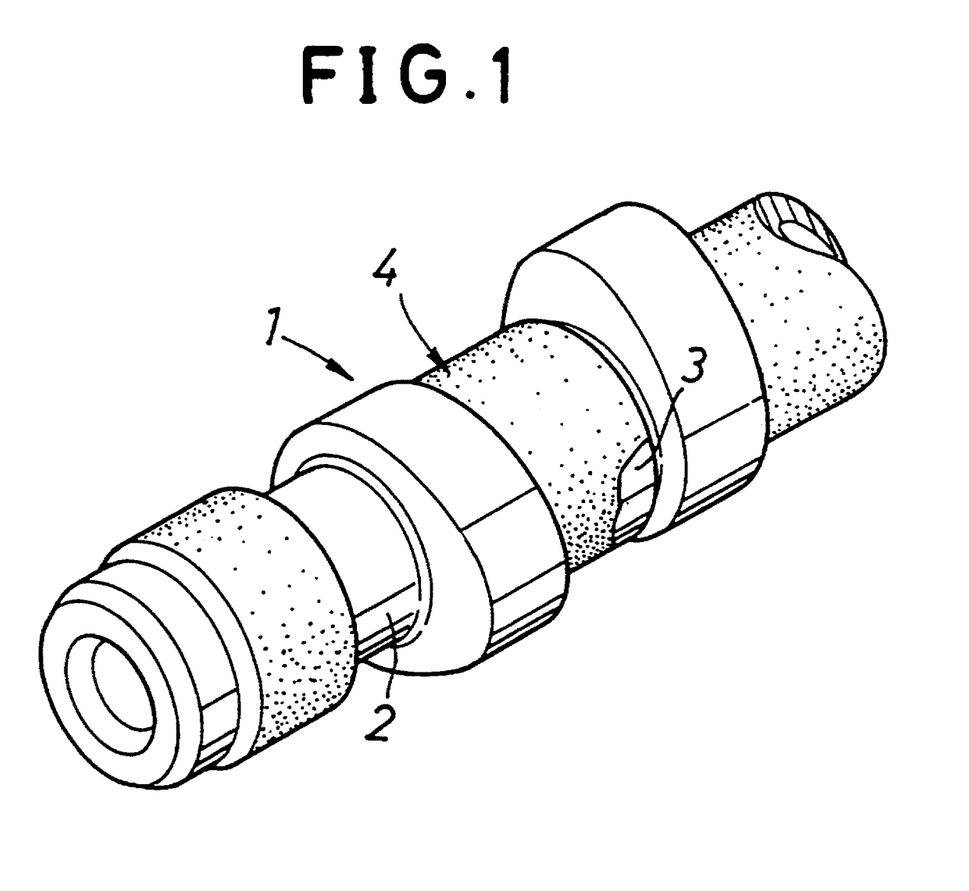
FIG. 1 is a perspective view of an essential portion of a cam shaft.
Figure 2:
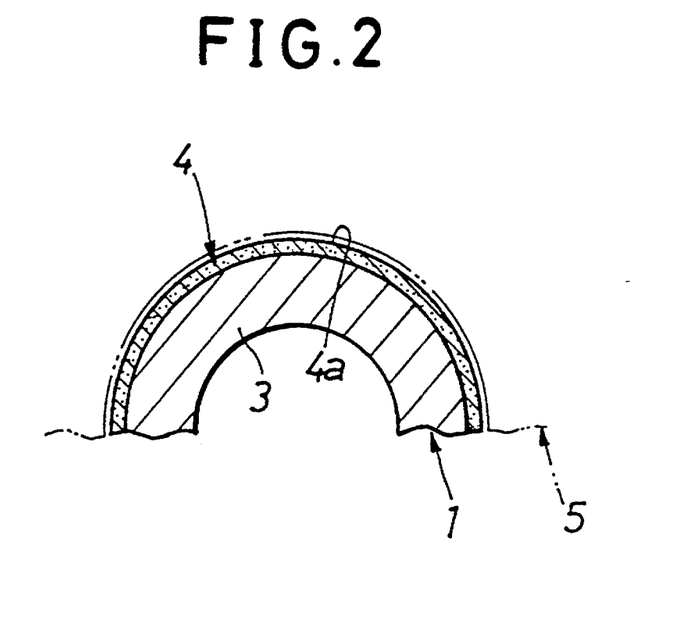
FIG. 2 is a sectional view of an essential portion of a journal portion in the cam shaft.

Referring to FIGS. 1 and 2, a cam shaft 1 for an internal combustion engine includes a base material 2 of cast iron. A lamellar slide surface construction 4 is formed by plating around the outer peripheral surface of a journal portion 3 of the base material 2.

Figure 3:
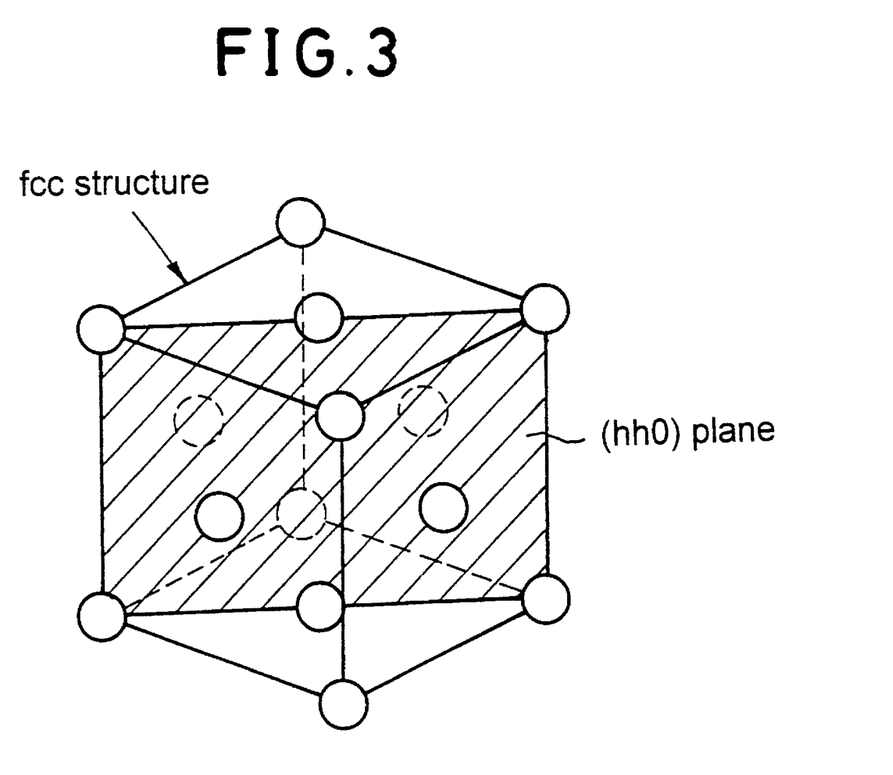
FIG. 3 is a perspective view illustrating a face-centered cubic structure and its (hh0) plane.
Figure 4:
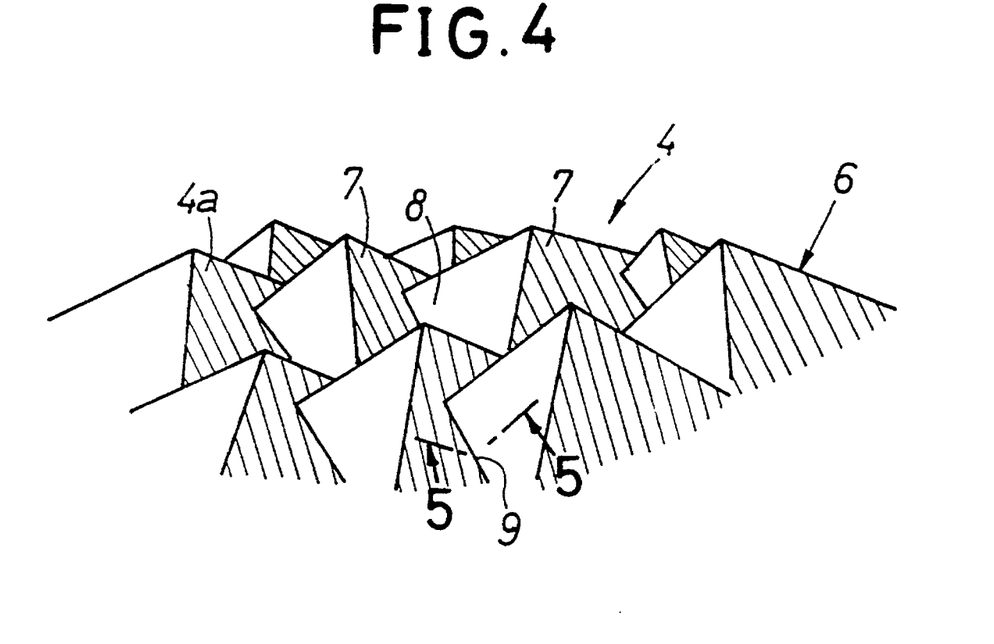
FIG. 4 is a perspective view of an essential portion of one example of a slide surface construction.

As shown in FIGS. 3 and 4, the slide surface construction 4 is formed of an aggregate of metal crystals having a face-centered cubic structure (fcc structure). The aggregate includes (hh0) oriented metal crystals with their (hh0) planes (by Miller indices) oriented toward a slide surface 4a for a bearing member 5. The content S of the (hh0) oriented metal crystals is set in a range represented by S<25%.

Figure 5:
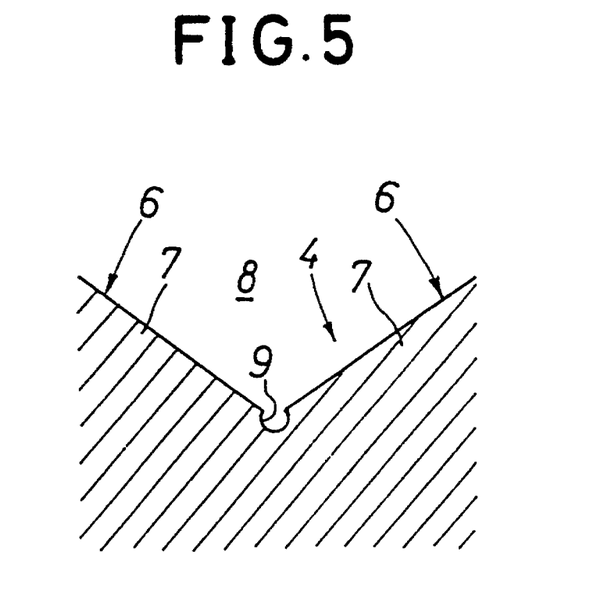
FIG. 5 is a sectional view taken along line 5—5 in FIG. 4.

If the content S of the (hh0) oriented metal crystals 6 is set in the above range, a large number of pyramid-shaped (and/or truncated pyramid-shaped), e.g., quadrangular pyramid-shaped (in the illustrated embodiment) metal crystals 6 are precipitated in the slide surface 4a into mutually biting states. Thus, the slide surface 4a takes on an intricate morphology comprising a large number of crests 7, valleys 8 formed between the crests 7, and a large number of swamps 9 formed due to the mutual biting of the crests 7. Therefore, the slide surface construction 4 has a good oil retention. In addition, the tip ends of the quadrangular pyramid-shaped metal crystals 6 are preferentially worn, thereby providing an improved conformability to the slide surface construction 4.

Examples of metals having the fcc structure are those of simple metal such as Pb, Ni, Cu, Pt, Al, Ag, Au, etc., and alloys thereof.

In the plating treatment for forming the slide surface construction 4 according to the present invention, basic conditions for the electrolytic deposition of a Ni-plating are as given in Tables 1 and 2.

TABLE 1

| Plating bath composition (g/liter) | | |
|---|---|---|
| Nickel sulfate | Nickel chloride | Boric acid |
| 200–400 | 50–150 | 5–50 |

TABLE 2

| Treating conditions | | |
|---|---|---|
| Plating bath pH | Plating bath temperature (°C.) | Cathode current density (A/dm$^2$) |
| 3–6 | 10–70 | 7–12 |

In the electrolytic deposition of the Ni-plating under the above-described conditions, the precipitation and content of the (hh0) oriented Ni crystals are controlled by the cathode current density, the pH of the plating bath and the like.

In addition to electrolytic plating processes, examples of other plating treatments that may be used are PVD processes, CVD processes, sputtering processes, ion plating and the like, which are gas-phase processes. Conditions for Pt- or Al-plating by a sputtering process are, for example, an Ar pressure of 0.8 to 1 Pa; an Ar acceleration power of 200 to 1,000 W in direct current; and a base material temperature of 80° to 300° C. Conditions for Al-plating by a CVD process are, for example, using a starting material of Al (CH$_3$)$_3$; a gas flow rate of 1 to 10 cc/min.; a pressure of 50 to 300 Pa within the chamber; and a base material temperature of 300° to 600° C.

Particular examples will be described below.

A plurality of cam shafts 1 for internal combustion engines were produced by subjecting the outer peripheral surface of a journal portion 3 of a base material of cast iron to an electrolytic Ni-plating process to form a slide surface construction 4 comprised of an aggregate of Ni crystals.

Tables 3 and 4 show the conditions used for the electrolytic deposition of the Ni-plating in examples 1 to 11 of the slide surface construction 4.

TABLE 3

| Example No. | Plating bath composition (g/liter) | | |
|---|---|---|---|
| | Nickel sulfate | Nickel chloride | Boric acid |
| 1 | 300 | 90 | 30 |
| 2 | 300 | 90 | 30 |
| 3 | 300 | 90 | 30 |
| 4 | 300 | 90 | 30 |
| 5 | 300 | 90 | 30 |
| 6 | 300 | 90 | 30 |
| 7 | 300 | 90 | 30 |
| 8 | 300 | 90 | 30 |
| 9 | 300 | 90 | 30 |
| 10 | 300 | 90 | 30 |
| 11 | 300 | 90 | 30 |

TABLE 4

| Example No. | Treating conditions | | |
|---|---|---|---|
| | Plating bath pH | Plating bath temperature (°C.) | Cathode current density (A/dm$^2$) |
| 1 | 3.5 | 55 | 10 |
| 2 | 4 | 55 | 10 |
| 3 | 4.15 | 55 | 10 |
| 4 | 4.2 | 55 | 10 |
| 5 | 5.5 | 55 | 10 |
| 6 | 4 | 55 | 8 |
| 7 | 4 | 55 | 7 |
| 8 | 4 | 55 | 4 |
| 9 | 4 | 55 | 3.5 |
| 10 | 4 | 55 | 3 |
| 11 | 3 | 55 | 10 |

Tables 5 and 6 show the crystal shape of the slide surface 4a, the grain size of the Ni crystals, the content S of the oriented Ni crystals and the hardness for the examples 1 to 11.

TABLE 5

| Example No. | Crystal shape of slide surface | Grain size (μm) | Content S of oriented Ni crystals (%) {111} | {200} | {220} | {311} | Hardness (Hv) |
|---|---|---|---|---|---|---|---|
| 1 | QP* | about 2 | 17.3 | 5.1 | 2.6 | 75 | 200 |
| 2 | QP* | about 2 | 22.3 | 9.7 | 3.2 | 64.8 | 205 |
| 3 | QP* | about 2 | 31.7 | 12 | 5.4 | 50.9 | 224 |
| 4 | QP* Very fine grain | about 2– about 0.5 | 33 | 16.1 | 10.5 | 40.4 | 222 |
| 5 | DQP* | about 1.5 (ridge-wise) | 42.5 | 20 | 7.2 | 27.3 | 442 |
| 6 | QP* Very fine grain | about 2– about 0.5 | 33.1 | 14.1 | 14.8 | 38 | 225 |

QP* = Quadrangular pyramid
DQP* = Deformed quadrangular pyramid

TABLE 6

| Example No. | Crystal shape of slide surface | Grain size (μm) | Content S of oriented Ni crystals (%) {111} | {200} | {220} | {311} | Hardness (Hv) |
|---|---|---|---|---|---|---|---|
| 7 | QP* Very fine grain | about 2– about 0.5 | 31.6 | 12.3 | 19.8 | 36.3 | 248 |
| 8 | QP* Very fine grain | about 2– about 0.5 | 29 | 10.2 | 25.2 | 35.6 | 221 |
| 9 | IQP* | about 2 | 26 | 11 | 32.6 | 30.4 | 250 |
| 10 | IQP* | about 3 | 18.2 | 11.5 | 50.3 | 20 | 300 |
| 11 | QP* | about 2 | 17 | 3 | 0 | 80 | 210 |

QP* = Quadrangular pyramid
IQP* = Imperfect quadrangular pyramid

Figure 6:
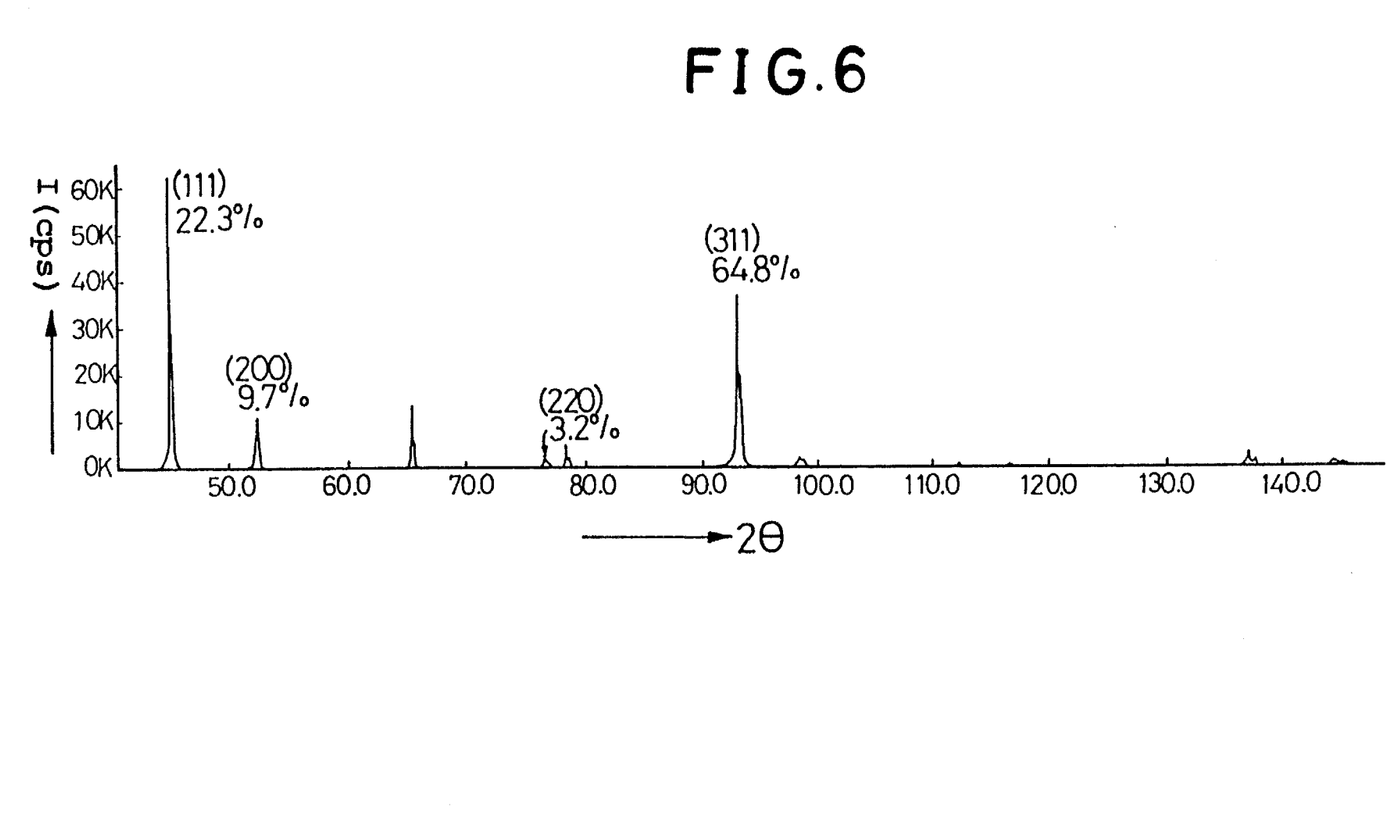
FIG. 6 is an X-ray diffraction pattern for one example of the slide surface construction.

The content S was determined in the following manner on the basis of X-ray diffraction patterns (X-rays were applied in a direction perpendicular to the slide surface 4a) for the examples 1 to 11. The example 2 will be described below. FIG. 6 is an X-ray diffraction pattern for the example 2. The content S of each of the oriented Ni crystals was determined from each of the following expressions. Here, the term "{111} oriented Ni crystal" means, for example, an oriented Ni crystals with its {111} plane oriented toward the slide surface 4a.

{111} oriented Ni crystals: $S_{111} = \{I_{111}/IA_{111})/T\} \times 100$

{200} oriented Ni crystals: $S_{200} = \{(I_{200}/IA_{200})/T\} \times 100$

{220} oriented Ni crystals: $S_{220} = \{(I_{220}/IA_{220})/T\} \times 100$

{311} oriented Ni crystals: $S_{311} = \{(I_{311}/IA_{311})/T\} \times 100$ wherein each of $I_{111}$, $I_{200}$, $I_{220}$ and $I_{311}$ is a measurement (cps) of the intensity of X-rays reflected from each crystal plane; each of $IA_{111}$, $IA_{200}$, $IA_{220}$ and $IA_{311}$ is an intensity ratio of X-rays reflected from each crystal plane in an ASTM card. Further, $IA_{111}=100$, $IA_{200}=42$, $IA_{220}=21$, and $IA_{311}=20$. Furthermore, $T=(I_{111}/IA_{111})+(I_{200}/IA_{200})+(I_{220}/IA_{220})+(I_{311}/IA_{311})$.

Figure 7:
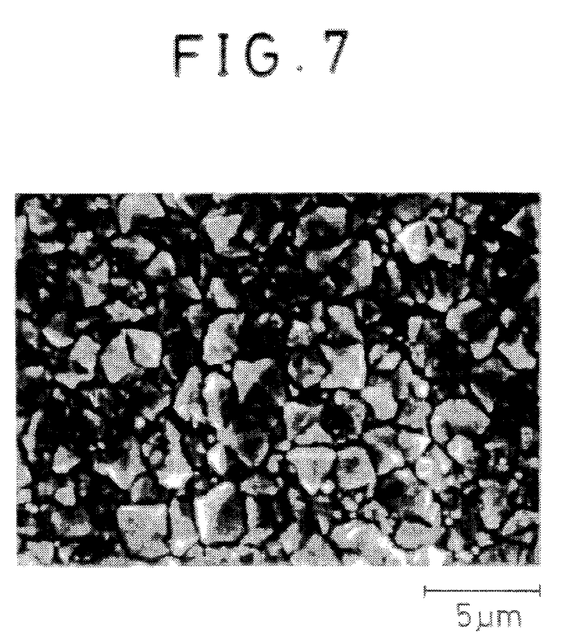
FIG. 7 is a photomicrograph showing the crystal structure of the slide surface in one example of the slide surface construction.

FIG. 7 is a photomicrograph showing the crystal structure of the slide surface 4a in the example 2. In FIG. 7, a large number of mutually bitten quadrangular pyramid-shaped Ni crystals are observed. As shown in Table 5 and FIG. 6, the content S of the (hh0), i.e., {220} oriented Ni crystals in the example 2 is equal to 3.2%.

Figure 8:
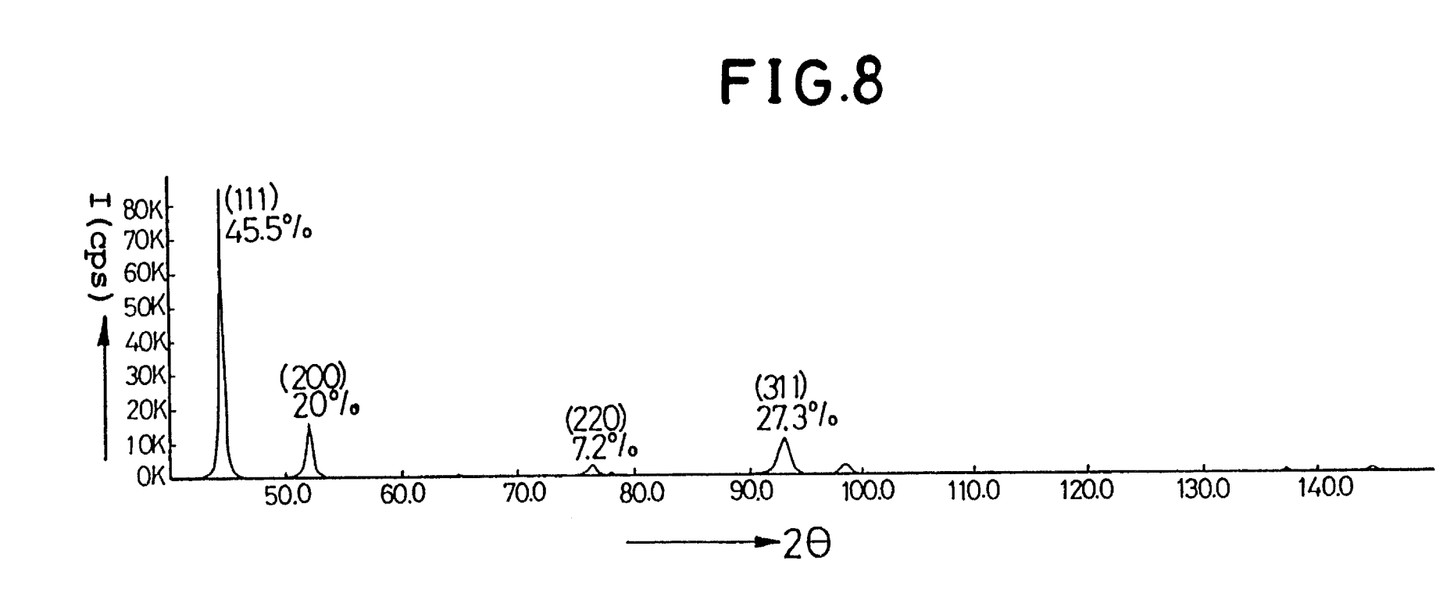
FIG. 8 is an X-ray diffraction pattern for another example of the slide surface construction.
Figure 9A:
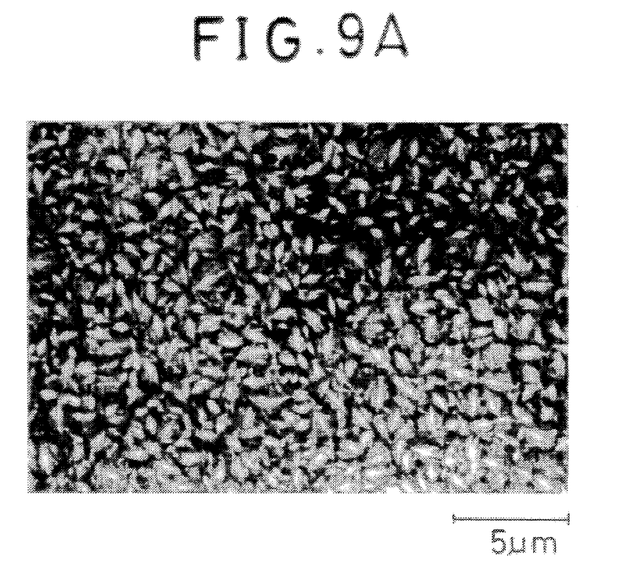
FIG. 9A is a photomicrograph showing the crystal structure of the slide surface in the other example of the slide surface construction.
Figure 9B:
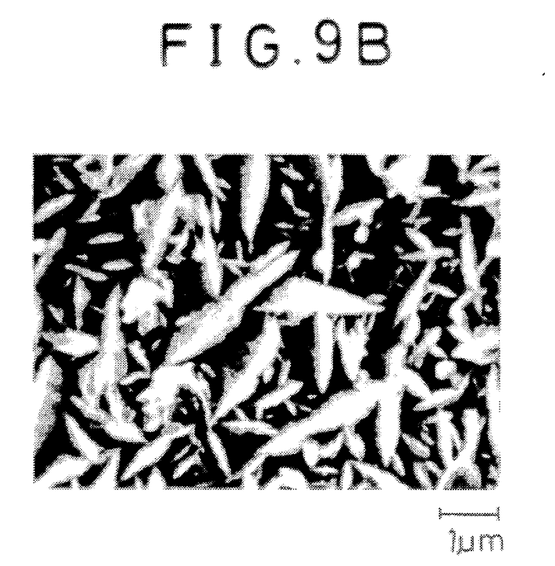
FIG. 9B is an enlarged photomicrograph taken from FIG. 9A.

FIG. 8 is an X-ray diffraction pattern for the example 5. FIGS. 9A and 9B are photomicrographs showing the crystal structure of the slide surface 4a in the example 5. FIG. 9B is an enlarged photomicrograph taken from FIG. 9A. In FIGS. 9A and 9B, a large number of deformed quadrangular pyramid-shaped Ni crystals are observed. In this case, the content S of the {220} oriented Ni crystals is equal to 7.2%, as shown in Table 5 and FIG. 8.

Figure 10:
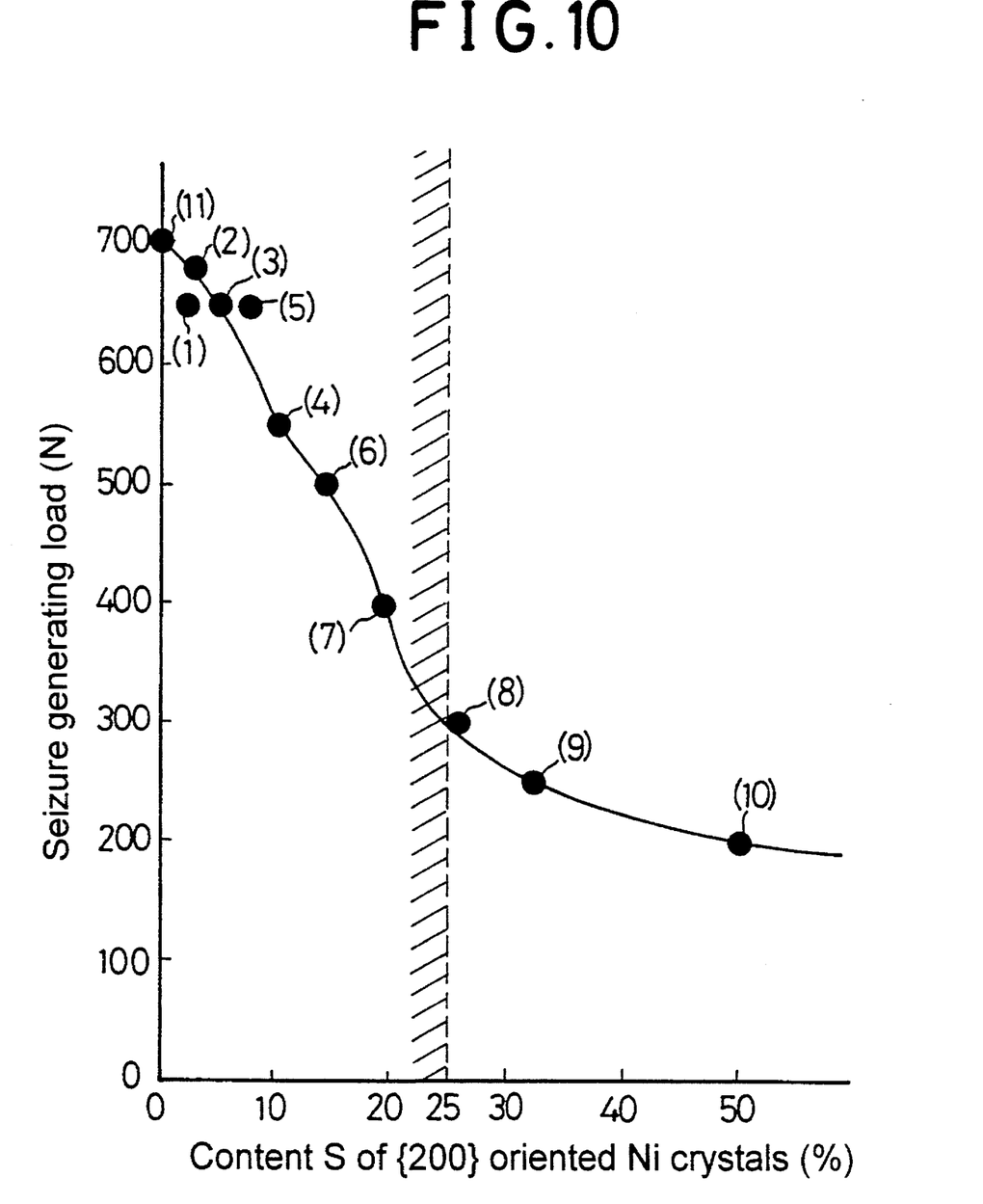
FIG. 10 is a graph illustrating results of a seizure test.

A seizure test for the examples 1 to 11 was carried out in a chip-on-disk manner to determine the relationship between the content S of the {220} oriented Ni crystals and the seizure generating load, thereby providing the results shown in Table 7 and FIG. 10. Conditions for the test were as follows: the material of the disk was an Al-10% by weight of Si alloy; the rotational speed of the disk was 15 m/sec.; the amount of oil supplied was 0.3 ml/min.; and the area of the slide surface of the chip made from the slide surface construction was 1 cm².

TABLE 7

| Example No. | Seizure generating load (N) |
|---|---|
| 1 | 650 |
| 2 | 680 |
| 3 | 650 |
| 4 | 550 |
| 5 | 650 |
| 6 | 500 |
| 7 | 400 |
| 8 | 300 |
| 9 | 250 |
| 10 | 200 |
| 11 | 700 |

FIG. 10 is a graph taken from Table 7, wherein points (1) to (11) correspond to the examples 1 to 11, respectively.

As apparent from Table 7 and FIG. 10, in the examples 1 to 7, which have a content S of the {220} oriented Ni crystals in a range of S<25%, the oil retention and initial conformability of the slide surface 4a are improved. Hence, the seizure generating load is also significantly enhanced, as compared with the examples 8, 9 and 10.

In the example 11, the content S of the {220} oriented Ni crystals is equal to 0%. By setting the content S at 0%, the quadrangular pyramid-shaped Ni crystals are precipitated in the largest concentration, leading to the best seizure resistance.

Figure 11:
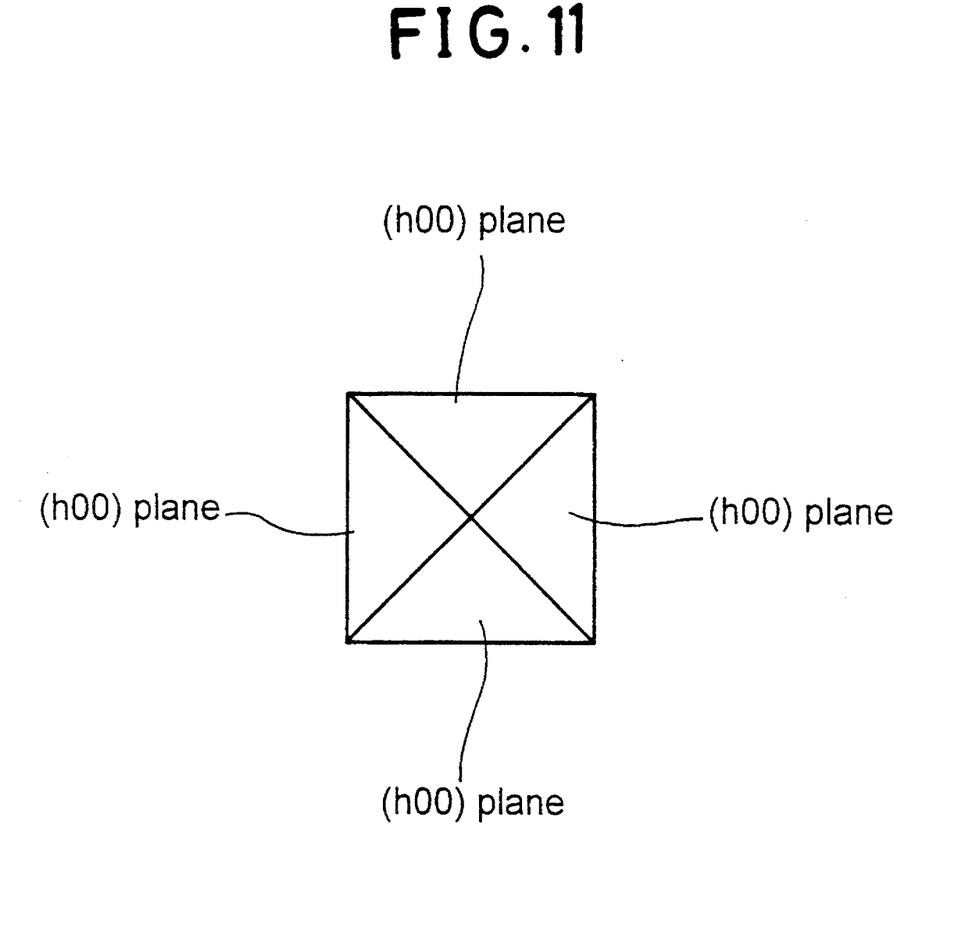
FIG. 11 is a plan view illustrating the crystal plane located on each slant in one example of a quadrangular pyramid-shaped tip end portion.
Figure 12:
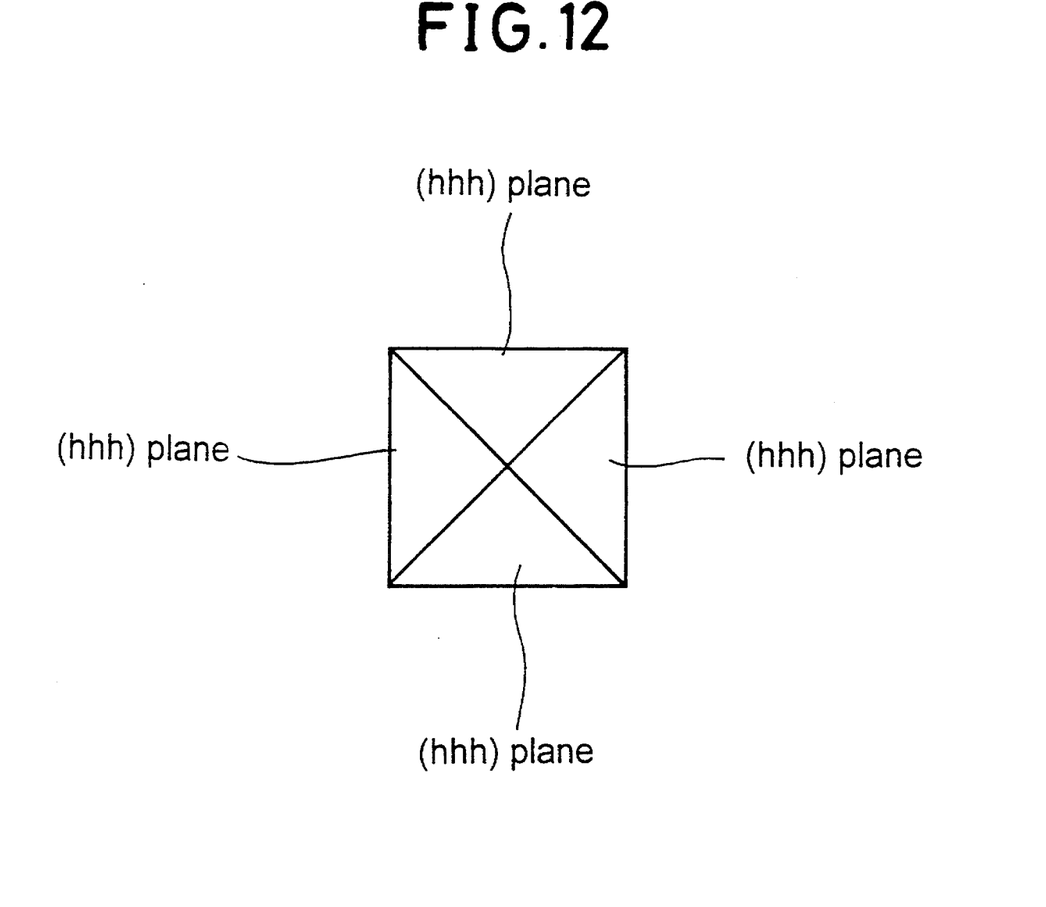
FIG. 12 is a plan view illustrating the crystal plane located on each slant in another example of a quadrangular pyramid-shaped tip end portion.

In the metal crystals having the face-centered cubic structure, the crystal shape in the slide surface, crystal planes located on the slants and the like for the oriented metal crystals are shown in Table 8.

TABLE 8

| Oriented metal crystal | Crystal shape on slide surface | Crystal plane located on slant | Characteristic of slant | Referential drawing |
|---|---|---|---|---|
| (3hhh) | Quadrangular pyramid | (h00) plane: highly atom-packed plane | Good wettability and good wear resistance | FIG. 11 |
| (h00) | Quadrangular pyramid | (hhh) plane: close-packed plane | High hardness, excellent wettability and good wear resistance | FIG. 12 |

It should be noted that for the wettability of the crystal planes located on the slants to oil or the like, the (hhh) plane is superior to the (h00) plane.

The slide surface construction of the present invention is applicable, for example, to the slide portion of any of the following parts of an internal combustion engine: pistons (land portions, skirt portions and ring grooves), piston rings, piston pins, connecting rods, crankshafts, bearing metals, oil pump rotors, oil pump rotor housings, springs (end faces), spring seats, spring retainers, cotters, rocker arms, roller bearing outer cases, roller bearing inner cases, needle bearing outer cases, needle bearing inner cases, valve stems, valve faces, hydraulic tappets, water pump rotor shafts, pulleys, gears, transmission shaft portions, clutch plates, washers, bolts (bearing surfaces and threaded portions), chins, metal belts, cylinders, cam shaft bearings.

What is claimed is:

1. A slide surface construction having a slide surface, said slide surface construction comprising an aggregate of metal crystals, wherein:

said metal crystals are formed from at least one metal selected from the group consisting of Ni and Ni alloy, said metal crystals have a face-centered cubic structure and are shaped at least partly into pyramid-shaped crystals, said aggregate of metal crystals include (hh0) oriented crystals with their (hh0) planes (by Miller indices) oriented toward the slide surface, the content S of said (hh0) oriented crystals being in a range represented by 0%≦S<25%, and said pyramid-shaped crystals include ones having their slant portions formed by (h00) planes.

2. A slide surface construction according to claim 1, wherein said aggregate of metal crystals further includes (3hhh) oriented crystals with their (3hhh) planes (by Miller indices) oriented toward the slide surface, said (3hhh) oriented crystals occupying greater than about 50% of said slide surface.

3. A slide surface construction having a slide surface, said slide surface construction comprising an aggregate of crystals, wherein:

said metal crystals are formed from at least one metal selected from the group consisting of Ni and Ni alloy, said metal crystals have a face-centered cubic structure and are shaped at least partly into pyramid-shaped crystals, said aggregate of metal crystals include (hh0) oriented crystals with their (hh0) planes (by Miller indices) oriented toward the slide surface, the content S of said (hh0) oriented crystals being in a range represented by 0%≦S<25%, and said pyramid-shaped crystals having slant portions which are formed by (hhh) planes.

4. A slide surface construction according to claim 3, wherein said aggregate of metal crystals further includes (h00) oriented crystals with their (h00) planes (by Miller indices) oriented toward the slide surface, the content S of said (h00) oriented crystals being in a range represented by 3%≦S<20%.

* * * * *